(12) United States Patent
Sun et al.

(10) Patent No.: US 9,019,900 B2
(45) Date of Patent: Apr. 28, 2015

(54) DEVICE AND SYSTEM FOR IMPLEMENTING MULTI-CARRIER HIGH SPEED DOWNLINK PACKET ACCESS SERVICE

(75) Inventors: Shaohui Sun, Shanghai (CN); Zhuo Gao, Shanghai (CN); Haijun Zhou, Shanghai (CN); Jinling Hu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 1738 days.

(21) Appl. No.: 11/994,775

(22) PCT Filed: Jul. 3, 2006

(86) PCT No.: PCT/CN2006/001548
§ 371 (c)(1),
(2), (4) Date: Jul. 23, 2008

(87) PCT Pub. No.: WO2007/003134
PCT Pub. Date: Jan. 11, 2007

(65) Prior Publication Data
US 2009/0141678 A1    Jun. 4, 2009

(30) Foreign Application Priority Data
Jul. 4, 2005 (CN) .......................... 2005 1 0080639

(51) Int. Cl.
*H04H 20/67* (2008.01)
*H04L 5/00* (2006.01)
(Continued)

(52) U.S. Cl.
CPC ............ *H04L 5/0064* (2013.01); *H04L 1/1819* (2013.01); *H04L 1/1887* (2013.01);
(Continued)

(58) Field of Classification Search
CPC ...................................................... H04W 72/04
USPC .......... 370/329, 341, 431, 437; 455/450, 452, 455/464, 509
See application file for complete search history.

(56) References Cited

U.S. PATENT DOCUMENTS
2003/0147371 A1* 8/2003 Choi et al. ................ 370/341
2004/0165554 A1  8/2004 Chao et al.
(Continued)

FOREIGN PATENT DOCUMENTS
CN    1395386    2/2003
CN    1418038    5/2003
(Continued)

OTHER PUBLICATIONS
International Search Report issued Nov. 9, 2006 for PCT/CN2006/001548 (2 pgs).
(Continued)

*Primary Examiner* — Derrick Ferris
*Assistant Examiner* — Abdelnabi Musa
(74) *Attorney, Agent, or Firm* — Norton Rose Fulbright US LLP

(57) ABSTRACT

The invention discloses a device and a system for implementing a multi-carrier high speed downlink packet access service, thereby accomplishing multi-carrier high speed downlink packet access service transmission by means of multi-carrier high speed downlink packet processing devices provided in a base station and a user equipment in the system and managing high speed downlink packets corresponding to the carriers separately by means of hybrid automatic repeat request modules corresponding to the carriers. The invention further discloses a method for implementing a multi-carrier high speed downlink packet access service, thereby allocating a separate transmitting hybrid automatic repeat request process and corresponding receiving hybrid automatic repeat request process for each carrier to accomplish transmission and receiving of high speed downlink packet access data. With the invention, the downlink data transmission rate in a radio mobile communication system supporting multiple carriers can be improved.

12 Claims, 4 Drawing Sheets

(51) Int. Cl.
*H04L 1/18* (2006.01)
*H04L 12/54* (2013.01)
*H04L 12/801* (2013.01)
*H04L 12/851* (2013.01)
*H04L 12/863* (2013.01)
*H04L 12/861* (2013.01)
*H04W 88/08* (2009.01)

(52) U.S. Cl.
CPC ............. *H04L5/0007* (2013.01); *H04L 5/0044* (2013.01); *H04L 12/5693* (2013.01); *H04L 47/10* (2013.01); *H04L 47/14* (2013.01); *H04L 47/2441* (2013.01); *H04L 47/34* (2013.01); *H04L 47/6215* (2013.01); *H04L 49/90* (2013.01); *H04L 49/9094* (2013.01); *H04W 88/08* (2013.01)

(56) References Cited

U.S. PATENT DOCUMENTS

| | | | |
|---|---|---|---|
| 2005/0135253 | A1* | 6/2005 | Cai et al. ................ 370/236 |
| 2006/0092973 | A1* | 5/2006 | Petrovic et al. ........... 370/469 |
| 2006/0242529 | A1* | 10/2006 | Terry et al. ............... 714/749 |

FOREIGN PATENT DOCUMENTS

| | | |
|---|---|---|
| CN | 1472973 | 2/2004 |
| CN | 2662570 | 12/2004 |
| CN | 1764100 | 4/2006 |
| EP | 1 950 903 | 7/2008 |
| JP | 11-055206 A | 2/1999 |
| JP | 2005-525745 | 8/2005 |
| JP | 2006-514514 | 4/2006 |
| JP | 2007-510355 | 4/2007 |
| KR | 2008-0025414 | 3/2008 |
| WO | WO-2004/075569 A2 | 2/2004 |
| WO | WO 2004/075569 | 9/2004 |
| WO | WO-2005/020519 | 3/2005 |

OTHER PUBLICATIONS

"3rd Generation Partnership Project; Technical Specification Group Radio Access Network; High speed Downlink Packet Access (HSDPA); Overall description; Stage 2 (Release 6)" 3rd Generation Partnership Project (3GPP)' Technical specification (TS), XX, XX, vol. 25. 308. No. V63.0. Dec. 1, 2004; pp. 1-28.

Qualcomm Europe; "System level Performance of MC-HSDPA with Enhanced Receivers and Multiple Receive Antennas-Full Buffer" 3GPP Draft; R1-050498, 3rd Generation Partnership Project (3GPP), Mobile Competence Centre; 650, Route Des Lucioles; F-06921, Sophia-Antipolis Cedex; France, vol. Ran WG1, No. Athens, Greece; 2005203, May 3, 2005; pp. 1-10.

"Universal Mobile Telecommunications System (UMTS); FDD enhanced uplink; overall description; stage 2 (3GPP TS 25.309 version 6.3.0 Release6); ETSI TS 125 309" ETSI Standards, LIS, Sophia Antipolis Cedex, France, vol. 3-R2, No. V6.3.0. Jun. 1, 2005; 34 pages.

Notice of Allowance issued for counter-part Application No. 10-2008-7002699, dated Mar. 15, 2010; 4 pages. (with English language translation).

Office Action issued for counter-part Japanese Application No. 2008-518602, dated Jul. 9, 2010; 5 pages (with English translation).

The extended European Search Report issued for Application No. 06761347.1, dated Dec. 2, 2010, 11 pages.

N. Yang, et al. "High Speed Downlink Packet Access (HSDPA) Technology", China Data Communication, the third period, 2005, pp. 70-73 (with English language abstract total 5 pages).

* cited by examiner

DEVICE AND SYSTEM FOR IMPLEMENTING MULTI-CARRIER HIGH SPEED DOWNLINK PACKET ACCESS SERVICE

FIELD OF THE INVENTION

The present invention relates to the field of mobile communication technologies, and particularly to a device, system and method for implementing a multi-carrier High Speed Downlink Packet Access (HSDPA) service.

BACKGROUND OF THE INVENTION

In order to meet the ever growing demand for data services, the 3rd Generation Partnership Project (3GPP) Release 5 has introduced HSDPA techniques, so as to improve downlink data transmission rate. The HSDPA techniques are applicable to Wideband Code Division Multiple Access Frequency Division Duplex (WCDMA FDD), Universal Terrestrial Radio Access Time Division Duplex (UTRA TDD), and Time Division-Synchronous Code Division Multiple Access (TD-SCDMA) schemes. Viewed from the technical standpoint, HSDPA is mainly implemented by introducing a High Speed Downlink Shared Channel (HS-DSCH) to enhance the air interface and adding corresponding function entities in a Universal Terrestrial Radio Access Network (UTRAN); viewed from the under-layer aspect, it is mainly implemented by introducing the Adaptive Modulation and Coding (AMC) and Hybrid Automatic Repeat reQuest (HARQ) techniques to increase the data throughput; and viewed from the overall architecture, it is mainly implemented by introducing a new Media Access Control Entity (MAC-hs) at the Media Access Control (MAC) layer of a base station (NodeB) to specially accomplish processing of parameters related to HS-DSCHs and of the HARQ protocol and adding relevant operating signaling at the higher layer and interfaces, so as to enhance the processing capability of the NodeB.

FIG. 1 shows a MAC-hs model at the UTRAN side. This entity is located at a NodeB, and comprises the following functional modules: a flow control module, a scheduling and priority handling module, an HARQ module, and a Transmission Format and Resource Combination (TFRC) selection module.

The data processing procedures (data transmission procedures) of the MAC-hs at the UTRAN side are as follows.

The higher layer transmits data via an Iub interface (an interface between the NodeB and a Radio Network Controller (RNC)) to the MAC-hs at the NodeB, in accordance with the capacity allocated by the MAC-hs flow control module.

The scheduling and priority handling module stores the data into a corresponding priority queue, in accordance with a mapping relationship configured by the higher layer when the connection is established.

The scheduling and priority handling module determines a priority queue to be scheduled, and determines whether to transmit new data or retransmit failed data.

The scheduling and priority handling module assembles a number of MAC-hs Service Data Units (SDUs) in the scheduled priority queue into a MAC-hs Protocol Data Unit (PDU), and determines its Queue Identifier (Queue ID) and Transmission Sequence Number (TSN). The MAC-hs PDUs from different priority queues are numbered separately; the initial value of a TSN is 0; for each queue, each time a new MAC-hs PDU is transmitted, the TSN is incremented by 1.

The scheduling and priority handling module submits the assembled MAC-hs PDU to the HARQ module, and notifies the HARQ module of the corresponding Queue ID and TSN.

The HARQ module selects an appropriate HARQ process to transmit the MAC-hs PDU, and sets the Queue ID and TSN therein.

The TFRC selection module selects an appropriate modulation and coding scheme, notifies the physical layer of the modulation and coding scheme, and submits the MAC-hs PDU to the physical layer. The physical layer notifies the User Equipment (UE) of the modulation scheme and the transmission block size through a High Speed Shared Control Channel (HS-SCCH), and transmits the MAC-hs PDU to the UE over a High Speed Physical Downlink Shared Channel (HS-PDSCH).

FIG. 2 shows a MAC-hs model at the UE side, which comprises the following functional modules: an HARQ module, a reordering queue distribution module, a reordering module, and a disassembly module.

The data processing procedures (data receiving procedures) of the MAC-hs at the UE side are as follows.

The HARQ module determines the HARQ process that is used to transmit the MAC-hs PDU currently and whether the data is new data or retransmitted data, in accordance with the information carried on the control channel.

If the data is new data, the HARQ module decodes the data and judges whether the data is received correctly. If the data is received correctly, it generates an Acknowledgement (ACK) message, and submits the data to the reordering queue distribution module. If the data is not received correctly, it generates a Non-Acknowledgement (NACK) message, and stores the failed data. The ACK or NACK message is fed back over the control channel to the UTRAN side for processing.

If the data is retransmitted data, the HARQ module combines the retransmitted data with the failed data, and then judge whether the data can be decoded correctly. If the data can be decoded correctly, the HARQ module generates an ACK message, and submits the data to the reordering queue distribution module. If the data can not be decoded correctly, the HARQ module generates a NACK message, and stores the combined data. The ACK or NACK message is fed back over the control channel to the UTRAN side for processing.

The reordering queue distribution module distributes the received MAC-hs PDU to a corresponding reordering buffer in accordance with the queue ID in the MAC-hs PDU.

The reordering module processes the data in the reordering buffer, and judges whether the data is received in sequence in accordance with the TSN in the MAC-hs PDU. If the data is received in sequence, the reordering module submits the MAC-hs PDU to the disassembly module. If the data is not received in sequence, it keeps the data in the buffer temporarily, and submits the MAC-hs PDU after all other MAC-hs PDUs with TSNs smaller than the TSN of the MAC-hs PDU have been received in sequence.

The disassembly module removes the header information and possible padding bits from the received MAC-hs PDU, and sends the MAC-d PDU contained in the MAC-hs PDU to a corresponding MAC-d entity.

The implementing method for a radio network or UE in the prior art is mainly proposed for single-carrier HSDPA, and therefore is inconvenient in managing and scheduling multi-carrier resources. For any UE, in each Transmission Time Interval (TTI) for the existing model, only one MAC-hs PDU from a priority queue is permitted to be transmitted, and only one HARQ entity is established for each UE at the UTRAN side. Therefore, if there are multiple carriers used to support HSDPA in a logic cell, the implementing method for a wireless network or UE in the prior art would not be able to meet the demand for multi-carrier HSDPA.

SUMMARY OF THE INVENTION

An object of the present invention is to provide a base station and UE for implementing a multi-carrier High Speed Downlink Packet Access (HSDPA) service, thereby overcoming the drawback in the prior art that a base station or UE only supports single-carrier HSDPA and implementing management of multi-carrier HSDPA resources at the base station and UE.

Another object of the present invention is to provide a system for implementing a multi-carrier HSDPA service, so that the HSDPA-based radio mobile communication system supports not only single-carrier HSDPA data transmission but also multi-carrier HSDPA data transmission.

Another object of the present invention is to provide a method for implementing a multi-carrier HSDPA service, thereby further improving downlink data transmission rate by transmitting HSDPA data via multiple carriers.

To attain above objects, the present invention provides the following technical solutions.

A base station for implementing a multi-carrier high speed downlink packet access service, which accomplishes multi-carrier high speed downlink packet access service transmission by means of a network-side multi-carrier high speed downlink packet processing device in the base station; the network-side multi-carrier high speed downlink packet processing device comprising a flow control module and a scheduling and priority handling module; wherein, the network-side multi-carrier high speed downlink packet processing device further comprises:

a plurality of network-side hybrid automatic repeat request modules and a plurality of transmission format and resource combination selection modules corresponding to carriers in a cell; and each of the plurality of network-side hybrid automatic repeat request modules is coupled to the scheduling and priority handling module, and is designed to manage a hybrid automatic repeat request process for a corresponding carrier; and each of the plurality of transmission format and resource combination selection modules is coupled to a corresponding hybrid automatic repeat request module, respectively, and is designed to select an appropriate transmission format and channel resource for data transmitted on a high speed downlink shared channel for a corresponding carrier.

A user equipment for implementing a multi-carrier high speed downlink packet access service, which accomplishes multi-carrier high speed downlink packet access service transmission by means of a user equipment-side multi-carrier high speed downlink packet processing device in the user equipment; the user equipment-side multi-carrier high speed downlink packet processing device comprising a reordering queue distribution module, at least one reordering module, and at least one disassembly module corresponding to the at least one reordering module; wherein, the user equipment-side multi-carrier high speed downlink packet processing device further comprises:

a plurality of user equipment-side hybrid automatic repeat request modules corresponding to carriers supported by the user equipment, each of which is coupled to the reordering queue distribution module, and is designed to handle a hybrid automatic repeat request on a corresponding carrier and perform a media access control function related to a hybrid automatic repeat request protocol.

A system for implementing a multi-carrier high speed downlink packet access service, comprising a base station and a user equipment; the base station and the user equipment being designed to accomplish multi-carrier high speed downlink packet access service transmission by means of a network-side multi-carrier high speed downlink packet processing device and a user equipment-side multi-carrier high speed downlink packet processing device, respectively; the multi-carrier high speed downlink packet processing device comprising a flow control module and a scheduling and priority handling module, and the user equipment-side multi-carrier high speed downlink packet processing device comprising a reordering queue distribution module, at least one reordering module, and at least one disassembly module corresponding to the at least one reordering module; wherein, the network-side multi-carrier high speed downlink packet processing device further comprises: a plurality of network-side hybrid automatic repeat request modules and a plurality of transmission format and resource combination selection modules corresponding to carriers in a cell; and each of the plurality of network-side hybrid automatic repeat request modules is coupled to the scheduling and priority handling module, and is designed to manage a hybrid automatic repeat request process corresponding to a carrier; and each of the plurality of transmission format and resource combination selection modules is coupled to a corresponding hybrid automatic repeat request module, and is designed to select an appropriate transmission format and channel resource for data transmitted on a high speed downlink shared channel for a corresponding carrier; and the user equipment-side multi-carrier high speed downlink packet processing device further comprises: a plurality of user equipment-side hybrid automatic repeat request modules corresponding to carriers supported by the user equipment, each of which is coupled to the reordering queue distribution module, and is designed to handle a hybrid automatic repeat request process on a corresponding carrier and perform a media access control function related to a hybrid automatic repeat request protocol.

A method for implementing a multi-carrier high speed downlink packet access service, so as to implement high speed downlink packet access service transmission between a base station and a user equipment in a radio mobile communication system that supports multiple carriers; the method comprising the following steps:

A. determining, by the base station, a carrier allocated to the user equipment and high speed downlink packet data to be transmitted on the carrier;

B. allocating a separate transmitting hybrid automatic repeat request process for the carrier to transmit the high speed downlink packet data to the user equipment;

C. receiving, by the user equipment, the high speed downlink packet data transmitted on the carrier, and determining the corresponding transmitting hybrid automatic repeat request process, in accordance with control information received over a downlink shared control channel;

D. allocating a receiving hybrid automatic repeat request process corresponding to the transmitting process for the received high speed downlink packet data to decode the high speed downlink packet data; and E. obtaining required service data in accordance with the high speed downlink packet data decoded during the receiving hybrid automatic repeat request process.

Step A can be implemented through the following steps:

A1. storing the service data to be transmitted by the base station into a corresponding priority queue;

A2. determining the carrier allocated to the user equipment and a corresponding priority queue in accordance with a predefined packet scheduling algorithm; and A3. generating a protocol data unit to be transmitted on the carrier in accordance with the priority queue.

Optionally, in one and the same transmission time interval, the high speed downlink packet data transmitted on a carrier comes from one and the same priority queue, and the high speed downlink packet data transmitted on different carriers comes from one and the same priority queue or different priority queues.

Wherein, step A3 comprises the following steps:

A31. assembling the service data in the priority queue into the protocol data unit, and determining a queue identifier and transmission sequence number of the protocol data unit; and A32. scheduling the protocol data unit to the corresponding carrier in accordance with the packet scheduling algorithm.

The high speed downlink packet data is transmitted to the user equipment through the following steps:

B1. allocating the separate transmitting hybrid automatic repeat request process for the carrier, and determining a modulation and coding scheme for the carrier;

B2. transmitting the protocol data unit to be transmitted on the carrier to the physical layer in the determined modulation and coding scheme; and B3. transmitting, by the physical layer, the protocol data unit to the user equipment over a high speed physical downlink shared channel.

Optionally, one and the same modulation and coding scheme or different modulation and coding modes may be employed for different carriers.

The required service data is obtained in accordance with the high speed downlink packet data decoded during the receiving hybrid automatic repeat request process through the following steps:

E1. obtaining the queue identifier and transmission sequence number of the protocol data unit decoded correctly during the receiving hybrid automatic repeat request process;

E2. reordering the protocol data unit in accordance with the queue identifier and transmission sequence number, to obtain a packet data queue corresponding to the priority queue; and E3. removing header information and padding bits from the protocol data unit in the packet data queue, to obtain the required service data.

It can be seen from the technical scheme provided in the present invention. with full consideration of the characteristics of multi-carrier HSDPA services, devices that support multi-carrier HSDPA services are established in a base station and a UE, respectively, and in the devices, an HARQ module is established for each carrier supported by the UE, and a separate HARQ process is established to transmit and receive HARQ packet data to manage the HARQ resources for each carrier, so that the base station and the UE can implement resource allocation and scheduling flexibly when multiple carriers support the HSDPA. Transmitting data on multiple carriers can further improve downlink data transmission rate and performance of HSDPA-based systems.

DETAILED DESCRIPTION OF THE EMBODIMENTS

The core ideal of the present invention is to establish a network-side multi-carrier high speed downlink packet processing device in a base station, and a UE-side multi-carrier high speed downlink packet processing device in a UE, to accomplish multi-carrier HSDPA service transmission. During data transmission, a network-side HARQ modules corresponding to a carrier in the multi-carrier high speed downlink packet processing device manages an HARQ process for the carrier; and during data receiving, a UE-side HRAQ module corresponding to a carrier in the multi-carrier high speed downlink packet processing device manages an HARQ process for the carrier. In that way, transmission and receiving of the multi-carrier high speed downlink packet data are accomplished.

For better understanding of the technical solutions provided in the present invention by those skilled in the art, hereunder the present invention will be further described in detail in connection with embodiments and with reference to the accompanying drawings.

Figure 1:
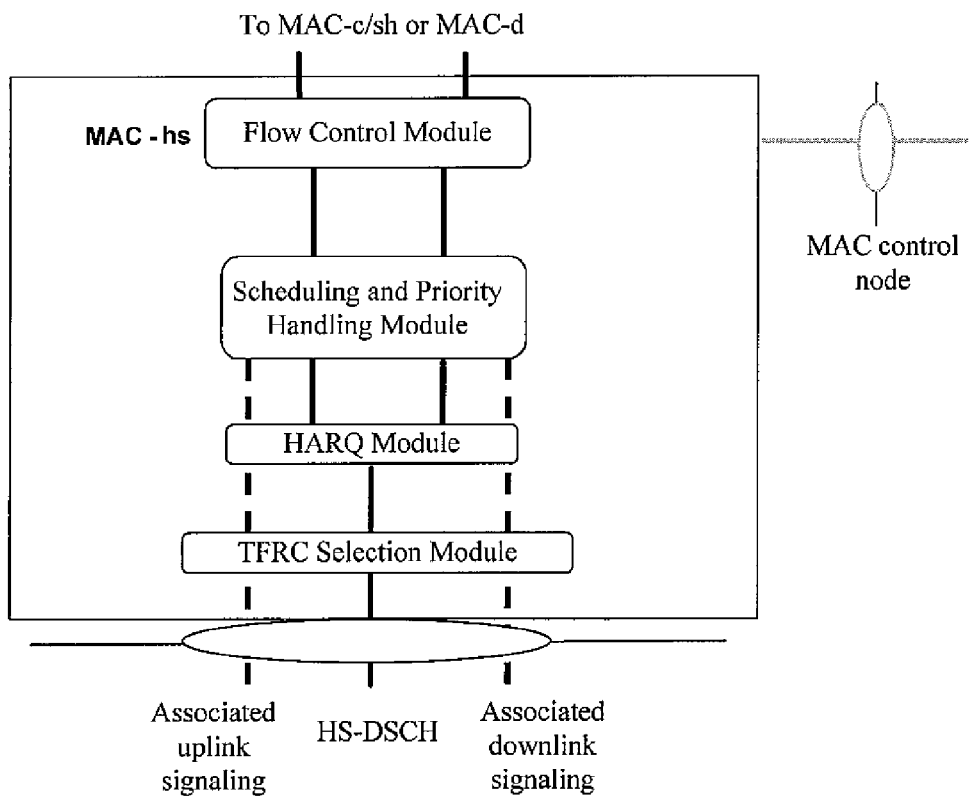
FIG. 1 shows a MAC-hs model at the UTRAN side in the prior art.
Figure 2:
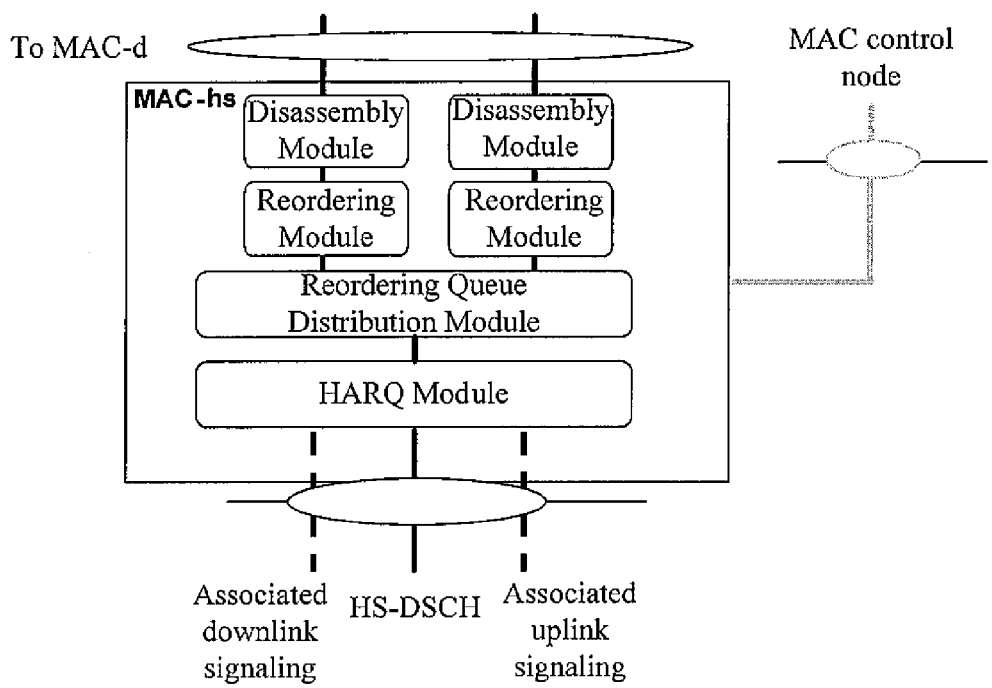
FIG. 2 shows a MAC-hs model at the UE side in the prior art.
Figure 3:
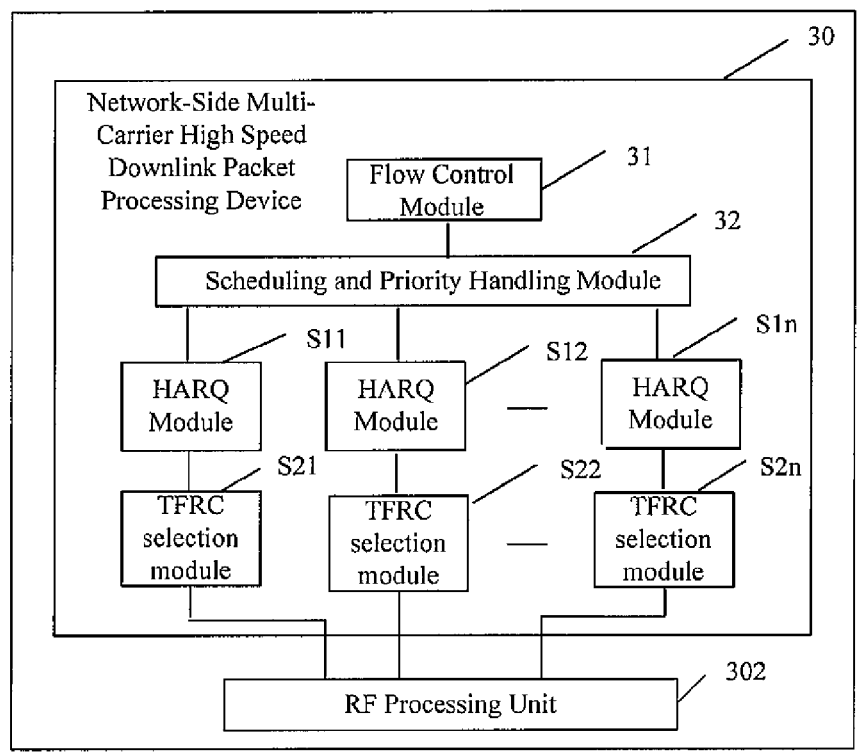
FIG. 3 is a block diagram illustrating a base station in an embodiment of the present invention.

Referring to FIG. 3, a block diagram illustrating a base station for implementing a multi-carrier HSDPA service in an embodiment of the present invention.

In order to implement multi-carrier HARQ functions, besides a radio frequency (RF) processing unit 302, the base station is further provided with a network-side multi-carrier high speed downlink packet processing device 30, which performs all HARQ functions. The data processed by a higher-layer processing unit in a Radio Network Controller (RNC) is sent to the device. The device allocates the data to multiple carriers. Then, the data is transmitted by the RF processing unit to a corresponding UE.

Of course, a baseband processing unit (not shown in FIG. 3) is provided between the RF processing unit 302 and the network-side multi-carrier high speed downlink packet processing device 30.

The network-side multi-carrier high speed downlink packet processing device 30 comprises:

a flow control module 31, a scheduling and priority handling module 32 connected to the flow control module 31, a plurality of network-side HARQ modules S11, S12, . . . , S1$n$ corresponding to carriers in a cell, and a plurality of TFRC selection modules S21, S22, . . . , S2$n$; wherein, each of the plurality of TFRC selection modules is connected to one of the plurality of network-side HARQ modules respectively; each of the plurality of network-side HARQ modules is designed to manage an HARQ resource for a corresponding carrier; and each of the plurality of TFRC selection modules is designed to select an appropriate transmission format and channel resource for data transmitted over an HS-DSCH for a corresponding carrier.

Hereunder the operations of the modules will be described in detail.

Flow control module: it works with a flow control module (not shown) responsible for management of common and shared channels and dedicated channels in the RNC to perform a flow control function; loads HARQ data processed by the higher-layer processing unit into a corresponding priority queue; and reduces Layer 2 signaling time delays by controlling data flow through the Iub interface (an interface between the base station and the RNC), and reduces data discarding and retransmission resulted from congestion on the HS-DSCH.

Scheduling and priority handling module: it is designed to assemble SDUs in the priority queue into a PDU, and allocate the PDU to a corresponding network-side HARQ module. Since data can be transmitted on multiple carriers to one and the same UE at a time, i.e. in each TTI, multiple PDUs can be transmitted to the same UE, during the scheduling process, the PDUs can be selected from one and the same priority queue or from different priority queues, depending on the packet data scheduling algorithm as employed.

Network-side HARQ module: it is designed to manage all HARQ processes for a corresponding carrier. The HARQ modules provided for different carriers are independent of one another.

TFRC selection module: it is designed to select an appropriate transmission format and channel resource for data transmitted over an HS-DSCH for a corresponding carrier.

The network-side multi-carrier high speed downlink packet processing device processes data as follows.

The higher-layer data processing unit sends the data via the Iub interface to the network-side multi-carrier high speed downlink packet processing device in the base station, in accordance with the capacity allocated by the flow control module.

The scheduling and priority handling module stores the data into a corresponding priority queue in accordance with a mapping relationship configured at the higher layer when the connection is established, and determines carriers to be allocated to the UE and the priority queue from which the data to be transmitted on each carrier comes, and determines whether to transmit new data or retransmit failed data. Then, the scheduling and priority handling module assembles a number of SDUs in the scheduled priority queue into a PDU, and determines the Queue ID and TSN of the PDU, and submits the assembled PDU to a network-side HARQ module corresponding to the carrier, and notifies the HARQ module of the corresponding Queue ID and TSN.

The PDUs from different priority queues are numbered separately. The initial value of a TSN is 0. For each queue, each time a new PDU is transmitted, the TSN is incremented by 1. If the data in a priority queue is to be transmitted on multiple carriers, a PDU will be assembled for each of the carriers.

The network-side HARQ module corresponding to each carrier selects an appropriate HARQ process to transmit the PDU, and manages the HARQ process for the carrier separately.

The TFRC selection module selects an appropriate modulation and coding scheme in the HARQ process selected by a corresponding network-side HARQ module and notifies the physical layer of the modulation and coding scheme. In addition, the TFRC selection module submits the PDU transmitted on the carrier to the physical layer. The physical layer notifies the UE of the modulation scheme as employed and the transmission block size through the HS-SCCH.

Figure 4:
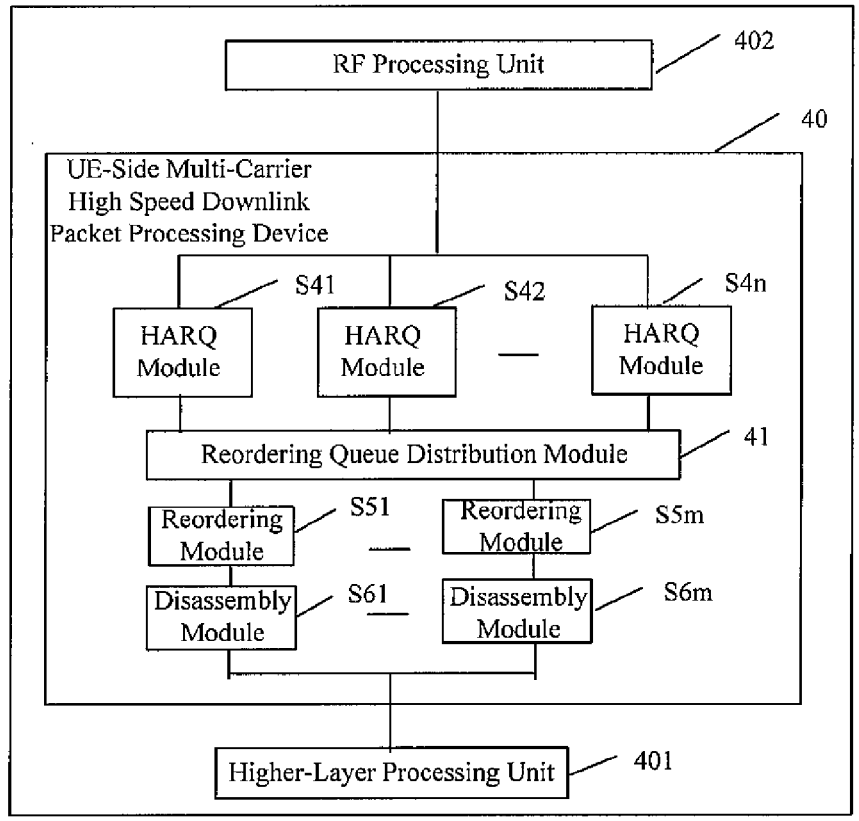
FIG. 4 is a block diagram illustrating a UE in an embodiment of the present invention.

Referring to FIG. 4, a schematic block diagram illustrating a UE for implementing a multi-carrier HSDPA service in the present invention.

In order to implement multi-carrier HARQ functions, besides a higher-layer processing unit 401 designed to decapsulate the data from the higher layer and an RF processing unit 402, the UE is also provided with a UE-side multi-carrier high speed downlink packet processing device 40 to perform all HARQ functions. The RF processing unit receives radio signals from the base station, and sends the demodulated data to the UE-side multi-carrier high speed downlink packet processing device. The UE-side multi-carrier high speed downlink packet processing device allocates a separate receiving HARQ process for each carrier to decode the received data, and generates a response message in accordance with the decoding result. Then, it reorders and disassembles the decoded data to recover the correct PDU, and submits the PDU to the higher-layer processing unit, and finally obtains the required signals.

Of course, a baseband processing unit (not shown) designed to process baseband signals is provided between the RF processing unit 402 and the UE-side multi-carrier high speed downlink packet processing device 40.

The UE-side multi-carrier high speed downlink packet processing device 40 comprises:

a reordering queue distribution module 41, a plurality of reordering modules S51, . . . , S5m, and a plurality of disassembly modules S61, . . . , S61m corresponding to the reordering modules. The number of the reordering modules is equal to the number of the priority queues. The HARQ function is performed by a plurality of UE-side HARQ modules S41, S42, . . . , S4n corresponding to carriers supported by the UE. Each of the HARQ modules is coupled to the reordering queue distribution module, and is designed to handle an HARQ request on a corresponding carrier and perform a MAC function related to the HARQ protocol.

Hereunder the functions of the modules will be described in detail.

UE-side HARQ module: it handles all HARQ processes on a carrier, and performs a MAC function related to the HARQ protocol, including decision on PDU combination and generation of ACK and NACK.

Reordering queue distribution module: it distributes the received PDU to a corresponding reordering buffer in accordance with the Queue ID in the PDU.

Reordering module: at the UE side, each Queue ID corresponds to a reordering module, which is responsible for sending the PDUs received in sequence in the reordering buffer to a corresponding disassembly module.

Disassembly module: it is responsible for removing the header information and possible padding bits from the PDU, and sending the SDUs in the PDU to the higher-layer processing unit.

The UE-side multi-carrier high speed downlink packet processing device processes data as follows.

The UE-side HARQ module determines the HARQ process that is currently used to transmit the PDU on each carrier and whether the data is new data or retransmitted data, in accordance with the information carried on the control channel.

If the data is new data, the HARQ module decodes the data and judges whether the data is received correctly; if the data is received correctly, it generates an ACK message, and submits the data to the reordering queue distribution module; and if the data is not received correctly, it generates a NACK message, and stores the failed data. The ACK or NACK message is fed back over the control channel to the network side for processing.

If the data is retransmitted data, the HARQ module combines the retransmitted data with the failed data, and then judges whether the data can be decoded correctly. If the data can be decoded correctly, the HARQ module generated an ACK message, and submits the data to the reordering queue distribution module; and if the data can not be decoded correctly, the HARQ module generates a NACK message, and stores the combined data. The ACK or NACK message is fed back over the control channel to the network side for processing.

The UE-side HARQ module corresponding to each carrier handles the receiving HARQ process separately.

The reordering queue distribution module distributes the received PDU to a corresponding reordering buffer in accordance with the Queue ID in the PDU.

The reordering module processes the data in the reordering buffer, and judges whether the data is received in sequence in accordance with the TSN in the PDU; if the data is received in sequence, it submits the PDU to the disassembly module; and otherwise, it keeps the data in the buffer temporarily. The reordering module submits the PDU after all other PDUs with TSNs smaller than the TSN of the PDU have been received in sequence.

The disassembly module removes the header information and possible padding bits from the PDU, and sends the SDUs in the PDU to the higher-layer processing unit.

Figure 5:
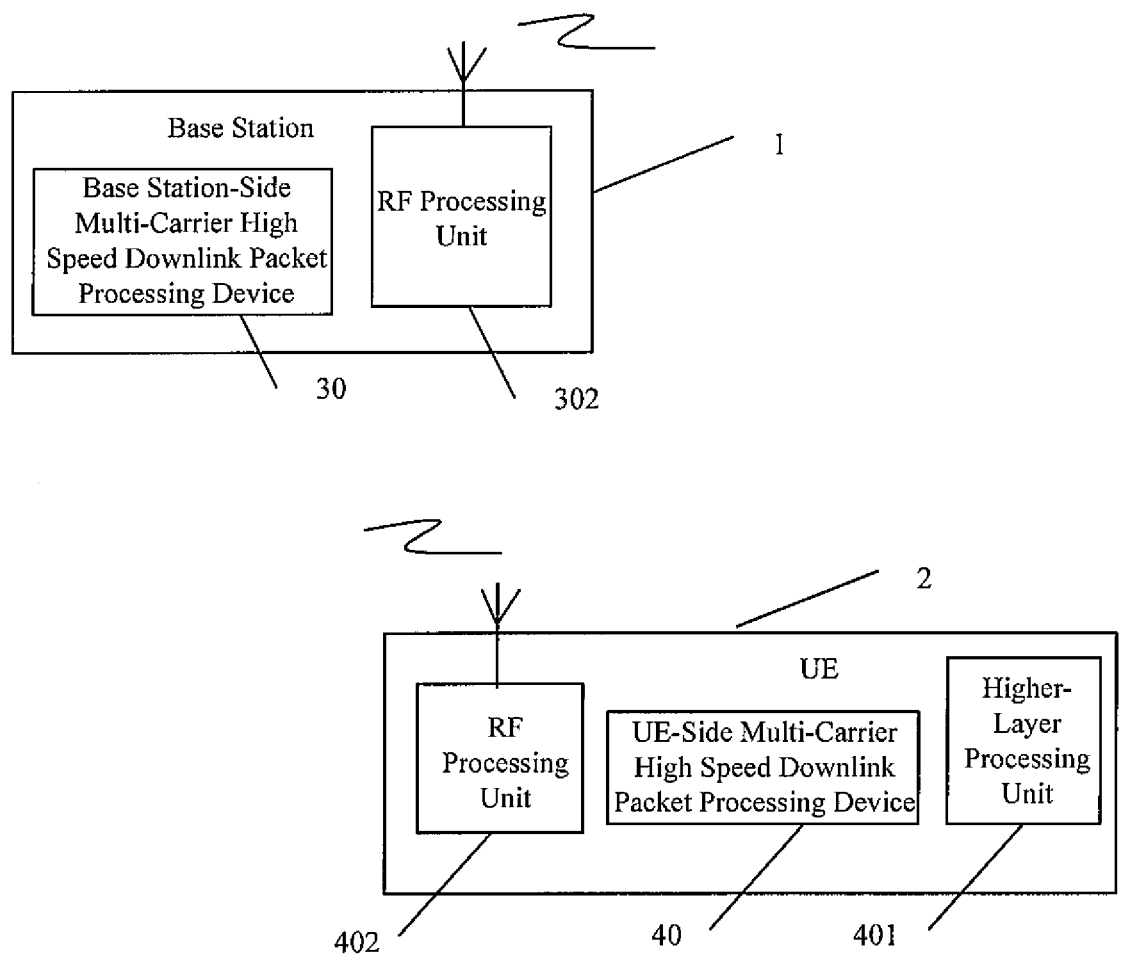
FIG. 5 is a block diagram illustrating a system in an embodiment of the present invention.

The architecture of a system for implementing multi-carrier HSDPA service is shown in FIG. 5.

In the system, a base station 1 and a UE 2 accomplish multi-carrier HSDPA service transmission by means of a network-side multi-carrier high speed downlink packet processing device 30 and a UE-side multi-carrier high speed downlink packet processing device 40 therein, respectively, RF processing units 302 and 402 at the base station side and the UE side are used to transmit and receive signals, respectively, wherein, the network-side multi-carrier high speed downlink packet processing device comprises: a flow control module, a scheduling and priority handling module, a plurality of network-side HARQ modules and a plurality of TFRC selection modules corresponding to carriers in a cell (a detailed structure is shown in FIG. 3); and the UE-side multi-carrier high speed downlink packet processing device comprises: a reordering queue distribution module, at least one reordering module, at least one disassembly module corresponding to the at least one reordering module, and a plurality of UE-side HARQ modules corresponding to carriers supported by the UE (a detailed structure is shown in FIG. 4).

The HARQ-related functions are mainly performed by the network-side HARQ modules and the UE-side HARQ modules. See the above description for the detailed operating processes of the modules.

It is to be noted that, if the number of carriers for providing the HSDPA service in a cell is smaller than the number of carriers supported by the UE, the number of the network-side HARQ modules required by the UE shall be equal to the number of carriers for providing the HSDPA service in the cell. That is to way, in actual applications, the number of the network-side HARQ modules configured for the UE in the base station shall matches the number of the UE-side HARQ modules required by the UE, and shall be the smaller of the number of carriers for providing the HSDPA service in the cell and the number of carriers supported by the UE.

Figure 6:
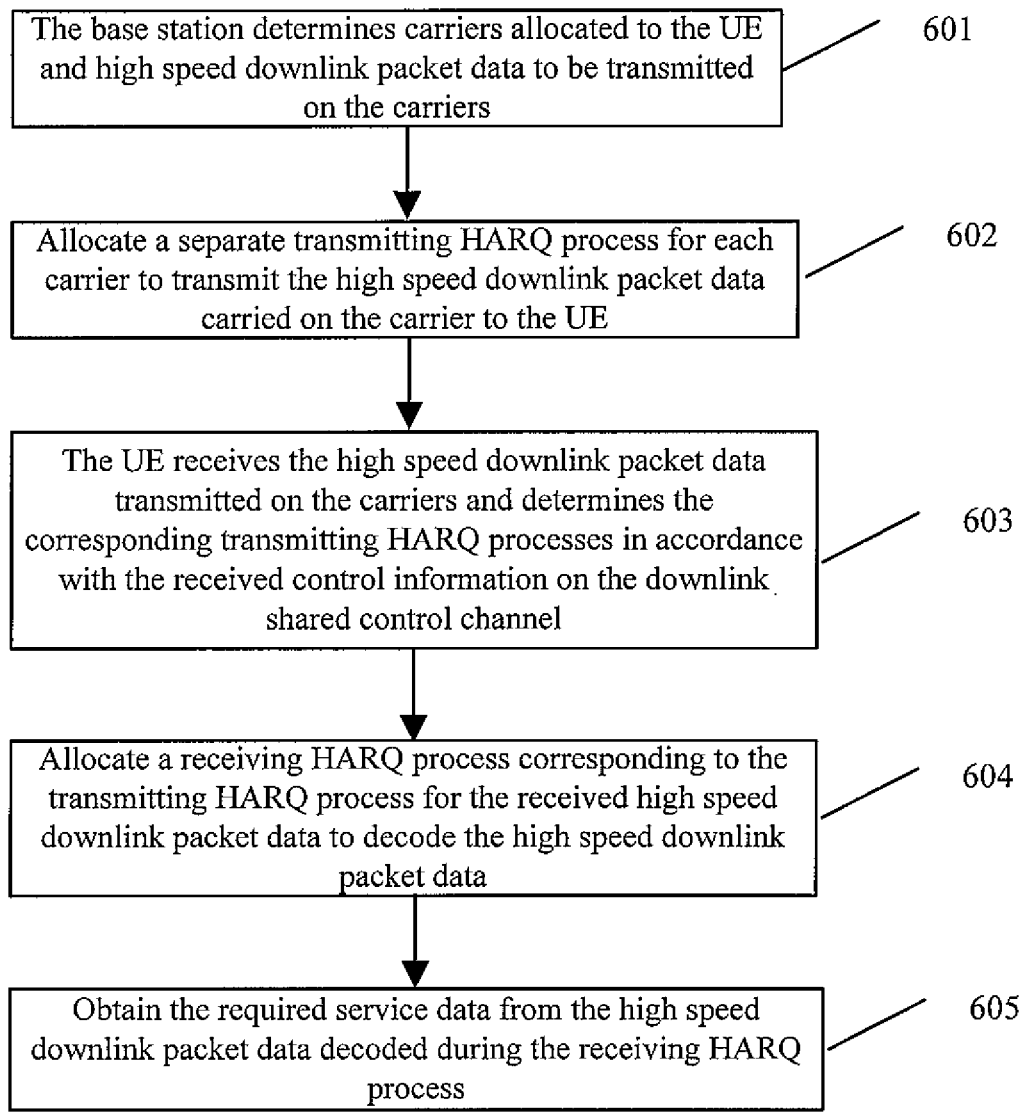
FIG. 6 is a flow diagram of a method in an embodiment of the present invention.

FIG. 6 shows the implementation flow of a method in an embodiment of the present invention, which comprises the following steps.

Step 601: the base station determines carriers allocated to a UE and high speed downlink packet data to be transmitted on the carriers.

First, the service data to be transmitted by the base station is stored in corresponding priority queues; then, the carriers allocated to the UE and the corresponding priority queues are determined in accordance with a predefined packet data scheduling algorithm, a number of SDUs in the scheduled priority queues are assembled into PDUs, and the Queue IDs and TSNs of the PDUs are determined; and then, the PDUs are scheduled to the corresponding carriers in accordance with the packet scheduling algorithm.

A carrier may correspond to one or more priority queues. That is to say, the data in a priority queue can be transmitted on one carrier or multiple carriers. If the data in a priority queue is to be transmitted on multiple carriers, a PDU must be assembled for each of the carriers.

Step 602: a separate transmitting HARQ process is allocated for each carrier to transmit the high speed downlink packet data carried on the carrier to the UE.

First, a separate transmitting HARQ process is allocated for each carrier, and the modulation and coding scheme is determined for the carrier. The carriers may employ one and the same modulation and coding scheme or different modulation and coding schemes.

Then, the PDU to be transmitted on the carrier is sent to the physical layer in the determined modulation and coding scheme; and the physical layer transmits the PDU to the UE over an HS-PDSCH.

Step 603: the UE receives the high speed downlink packet data transmitted on the carriers in accordance with the control information on the downlink shared control channel, and determines the corresponding transmitting HARQ process.

Step 604: a receiving HARQ process corresponding to the transmitting HARQ process is allocated for the received high speed downlink packet data to decode the high speed downlink packet data.

Step 605: the required service data is obtained in accordance with the high speed downlink packet data decoded during the receiving HARQ process correctly.

First, the Queue ID and TSN of the PDU decoded during the receiving HARQ process is obtained; then, the PDU is reordered in accordance with the obtained Queue ID and TSN, to obtain a packet data queue corresponding to the priority queue; and the header information and padding bits are removed from the PDU in the packet data queue, so that the required service data is obtained.

It can be seen that, with the method provided in the present invention, the support for the multi-carrier HARQ by a base station and UE can be implemented by allocating separate transmitting and receiving HARQ processes for each carrier to handle a HARQ process for each carrier. The method can be implemented simply and is highly expandable.

While the present invention has been illustrated and described in connection with embodiments, the present invention is not limited thereto. Those skilled in the art should recognize that various variations and modifications can be made without departing from the scope of the present invention as defined by the accompanying claims.

What is claimed is:

1. A base station for implementing a multi-carrier high speed downlink packet access service, which accomplishes multi-carrier high speed downlink packet access service transmission by means of a network-side multi-carrier high speed downlink packet processing device in the base station; the base station comprising a processor and a memory, the memory storing instructions for causing the processor to implement the network-side multi-carrier high speed downlink packet processing device; the network-side multi-carrier high speed downlink packet processing device comprising a flow control module and a scheduling and priority handling module; wherein, the network-side multi-carrier high speed downlink packet processing device further comprises:

a plurality of network-side hybrid automatic repeat request modules and a plurality of transmission format and resource combination selection modules corresponding to carriers in a cell, wherein one network-side hybrid automatic repeat request module corresponds to one carrier; and each of the plurality of network-side hybrid automatic repeat request modules is coupled to the scheduling and priority handling module, and is designed to manage a hybrid automatic repeat request process for a corresponding carrier; and each one of the plurality of transmission format and resource combination selection modules is coupled to one hybrid automatic repeat request module which only corresponds to the transmission format and resource combination selection module, respectively, and is designed to select an appropriate transmission format and channel resource for data transmitted on a high speed downlink shared channel for a corresponding carrier, and wherein the instructions include instructions for causing the processor to provide the plurality of network-side hybrid automatic repeat request modules, the plurality of transmission format and resource combination selection modules, and the scheduling and priority handling module.

2. The base station of claim 1 wherein the network-side multi-carrier high speed downlink packet processing device is operable to determine a particular carrier is allocated to a user equipment, wherein the network-side multi-carrier high speed downlink packet processing device is further operable to select high speed downlink packet data to be transmitted on the particular allocated carrier, and wherein the network-side multi-carrier high speed downlink packet processing device is further operable to allocate a separate transmitting hybrid automatic repeat request process for the particular allocated carrier to transmit the high speed downlink packet data to the user equipment.

3. The base station of claim 1 wherein the network-side multi-carrier high speed downlink packet processing device is operable to store service data to be transmitted by the base station into a corresponding priority queue, wherein the network-side multi-carrier high speed downlink packet processing device is further operable to determine the carrier allocated to a user equipment and a corresponding priority queue in accordance with a predefined packet scheduling algorithm, and wherein the network-side multi-carrier high speed downlink packet processing device is operable to generate a protocol data unit to be transmitted on the particular carrier allocated to the user equipment in accordance with the priority queue.

4. A user equipment for implementing a multi-carrier high speed downlink packet access service, which accomplishes multi-carrier high speed downlink packet access service transmission by means of a user equipment-side multi-carrier high speed downlink packet processing device in the user equipment; the user equipment comprising a processor and a memory, the memory storing instructions for causing the processor to implement the user equipment-side multi-carrier high speed downlink packet processing device; the user equipment-side multi-carrier high speed downlink packet processing device comprising a reordering queue distribution module, at least one reordering module, and at least one disassembly module corresponding to the at least one reordering module; wherein, the user equipment-side multi-carrier high speed downlink packet processing device further comprises:

a plurality of user equipment-side hybrid automatic repeat request modules corresponding to carriers supported by the user equipment, each of which is coupled to the reordering queue distribution module, and is designed to handle a hybrid automatic repeat request on a corresponding carrier and perform a media access control function related to a hybrid automatic repeat request protocol, wherein one user equipment-side hybrid automatic repeat request module corresponds to one carrier sent by one network-side transmission format and resource combination selection module which only corresponds to one network-side hybrid automatic repeat request module, and wherein the instructions include instructions for causing the processor to provide the plurality of user equipment-side hybrid automatic repeat request modules and the reordering queue distribution module.

5. The user equipment of claim 4 wherein the user equipment-side multi-carrier high speed downlink packet processing device is operable to receive a high speed downlink packet data transmitted on a particular corresponding carrier of the carriers supported by the user equipment, wherein the user equipment-side multi-carrier high speed downlink packet processing device is further operable to determine a corresponding transmitting hybrid automatic repeat request process, in accordance with control information received over a downlink shared control channel, wherein the user equipment-side multi-carrier high speed downlink packet processing device is further operable to allocate a receiving hybrid automatic repeat request process corresponding to the transmitting hybrid automatic repeat request process for the received high speed downlink packet data to decode the high speed downlink packet data, and wherein the user equipment is further operable to obtain service data in accordance with the high speed downlink packet data decoded during the receiving hybrid automatic repeat request process.

6. The user equipment according to claim 5, wherein the user equipment-side multi-carrier high speed downlink packet processing device obtains a queue identifier and transmission sequence number of a protocol data unit decoded correctly during the receiving hybrid automatic repeat request process, wherein the user equipment-side multi-carrier high speed downlink packet processing device reorders the protocol data unit in accordance with the queue identifier and transmission sequence number, to obtain a packet data queue corresponding to a priority queue, and wherein the user equipment-side multi-carrier high speed downlink packet processing device removes header information and padding bits from the protocol data unit in the packet data queue, to obtain the required service data.

7. The user equipment of claim 4 wherein the reordering queue distribution module distributes a received protocol data unit to a corresponding reordering buffer in accordance with a queue identification in the protocol data unit.

8. A system for implementing a multi-carrier high speed downlink packet access service, comprising a base station and a user equipment; the base station and the user equipment being designed to accomplish multi-carrier high speed downlink packet access service transmission by means of a network-side multi-carrier high speed downlink packet processing device and a user equipment-side multi-carrier high speed downlink packet processing device, respectively; the base station comprising a first processor and a first memory, the first memory storing instructions for causing the first processor to implement the network-side multi-carrier high speed downlink packet processing device; the user equipment comprising a second processor and a second memory, the second memory storing instructions for causing the second processor to implement the user equipment-side multi-carrier high speed downlink packet processing device; the multi-carrier high speed downlink packet processing device comprising a flow control module and a scheduling and priority handling module, and the user equipment-side multi-carrier high speed downlink packet processing device comprising a reordering queue distribution module, at least one reordering module, and at least one disassembly module corresponding to the at least one reordering module; wherein, the network-side multi-carrier high speed downlink packet processing device further comprises: a plurality of network-side hybrid automatic repeat request modules and a plurality of transmission format and resource combination selection modules corresponding to carriers in a cell, wherein one network-side hybrid automatic repeat request module corresponds to one carrier; and each of the plurality of network-side hybrid automatic repeat request modules is coupled to the scheduling and priority handling module, and is designed to manage a hybrid automatic repeat request process corresponding to a carrier; and each one of the plurality of transmission format and resource combination selection modules is coupled to one hybrid automatic repeat request module which only corresponds to the transmission format and resource combination selection module, and is designed to select an appropriate transmission format and channel resource for data transmitted on a high speed downlink shared channel for a corresponding carrier, and wherein the instructions include instructions for causing the processor to provide the plurality of network-side hybrid automatic repeat request modules, the plurality of transmission format and resource combination selection modules, and the scheduling and priority handling module; and the user equipment-side multi-carrier high speed downlink packet processing device further comprises: a plurality of user equipment-side hybrid automatic repeat request modules corresponding to carriers supported by the user equipment, each of which is coupled to the reordering queue distribution module, and is designed to handle a hybrid automatic repeat request process on a corresponding carrier and perform a media access control function related to a hybrid automatic repeat request protocol, and wherein the instructions include instructions for causing the processor to provide the plurality of user equipment-side hybrid automatic repeat request modules and the reordering queue distribution module.

9. The system according to claim 8, wherein the base station is operable to store service data to be transmitted by the base station into a corresponding priority queue, wherein the base station is further operable to determine a carrier allocated to the user equipment and a corresponding priority queue in accordance with a predefined packet scheduling algorithm, and wherein the base station is operable to generate a protocol data unit to be transmitted on the carrier allocated to the user equipment in accordance with the priority queue.

10. The system according to claim 8, wherein the base station is operable to determine a carrier is allocated to the user equipment, wherein said base station is further operable to select high speed downlink packet data to be transmitted on the carrier, and wherein the base station is further operable to allocate a separate transmitting hybrid automatic repeat request process for the carrier to transmit the high speed downlink packet data to the user equipment.

11. The system of claim 10 wherein the user equipment is operable to receive the high speed downlink packet data transmitted on the carrier, wherein the user equipment is further operable to determine the corresponding transmitting hybrid automatic repeat request process, in accordance with control information received over a downlink shared control channel, wherein the user equipment is further operable to allocate a receiving hybrid automatic repeat request process corresponding to the transmitting hybrid automatic repeat request process for the received the high speed downlink packet data to decode the high speed downlink packet data, and wherein the user equipment is further operable to obtain service data in accordance with the high speed downlink packet data decoded during the receiving hybrid automatic repeat request process.

12. The system according to claim 11, wherein the user equipment obtains a queue identifier and transmission sequence number of a protocol data unit decoded correctly during the receiving hybrid automatic repeat request process, wherein the user equipment recorders the protocol data unit in accordance with the queue identifier and transmission sequence number, to obtain a packet data queue corresponding to a priority queue, and wherein the user equipment removes header information and padding bits from the protocol data unit in the packet data queue, to obtain the required service data.

* * * * *

UNITED STATES PATENT AND TRADEMARK OFFICE
CERTIFICATE OF CORRECTION

PATENT NO. : 9,019,900 B2  
APPLICATION NO. : 11/994775  
DATED : April 28, 2015  
INVENTOR(S) : Shaohui Sun et al.

It is certified that error appears in the above-identified patent and that said Letters Patent is hereby corrected as shown below:

In the Specification:
At column 5, line number 56, delete "invention. with" and replace with --invention: with--.
At column 8, line number 30, delete "S61m" and replace with --S6m--.
At column 9, line number 33, delete "HS DPA" and replace with --HSDPA--.

Signed and Sealed this
Fourth Day of August, 2015

Michelle K. Lee
*Director of the United States Patent and Trademark Office*